Aug. 6, 1940.   H. K. JOHNSON   2,209,979
APPARATUS FOR SERVING FROZEN CONFECTION PRODUCTS
Filed Oct. 22, 1937   2 Sheets-Sheet 1
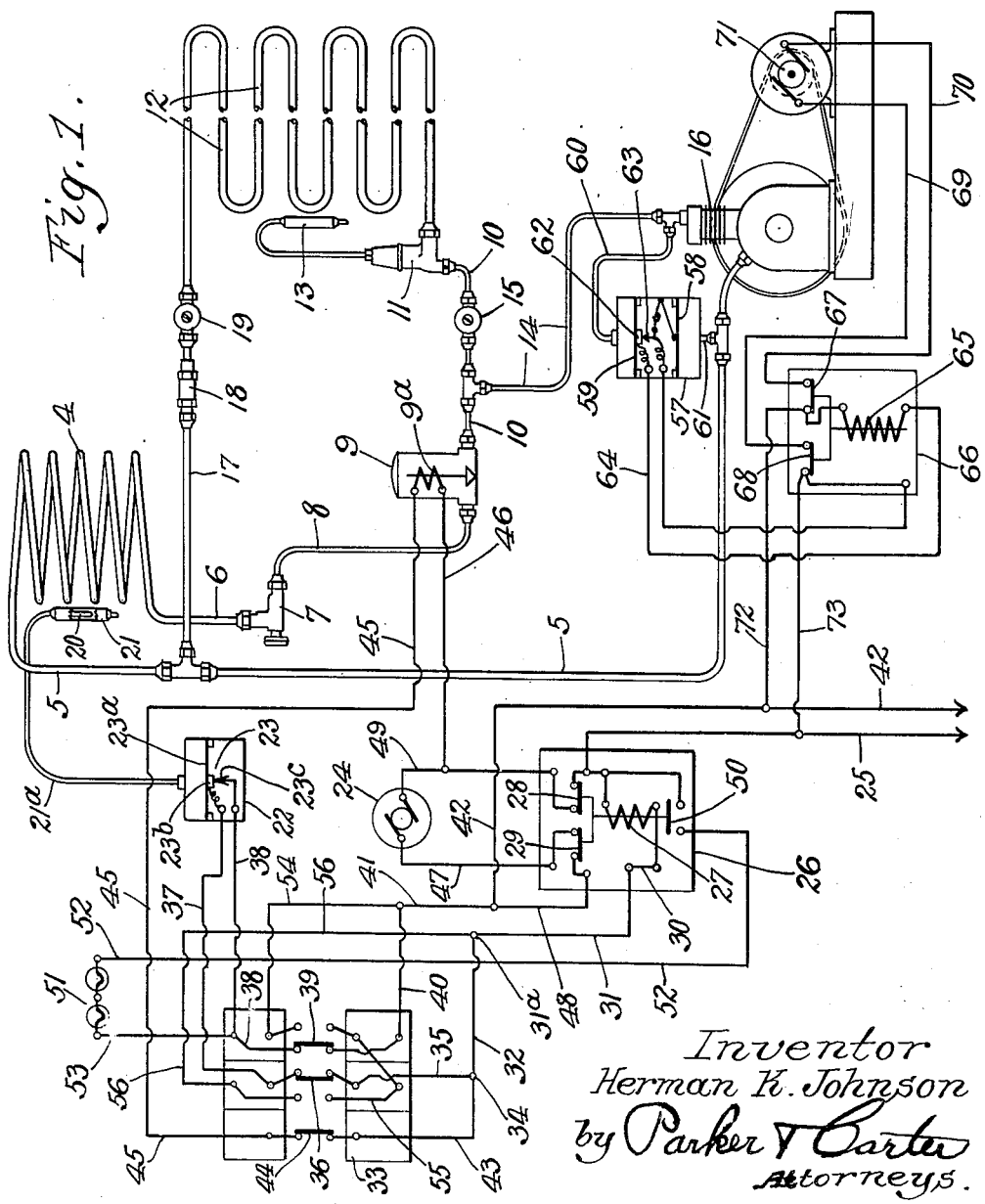
Inventor
Herman K. Johnson
by Parker & Carter
Attorneys.

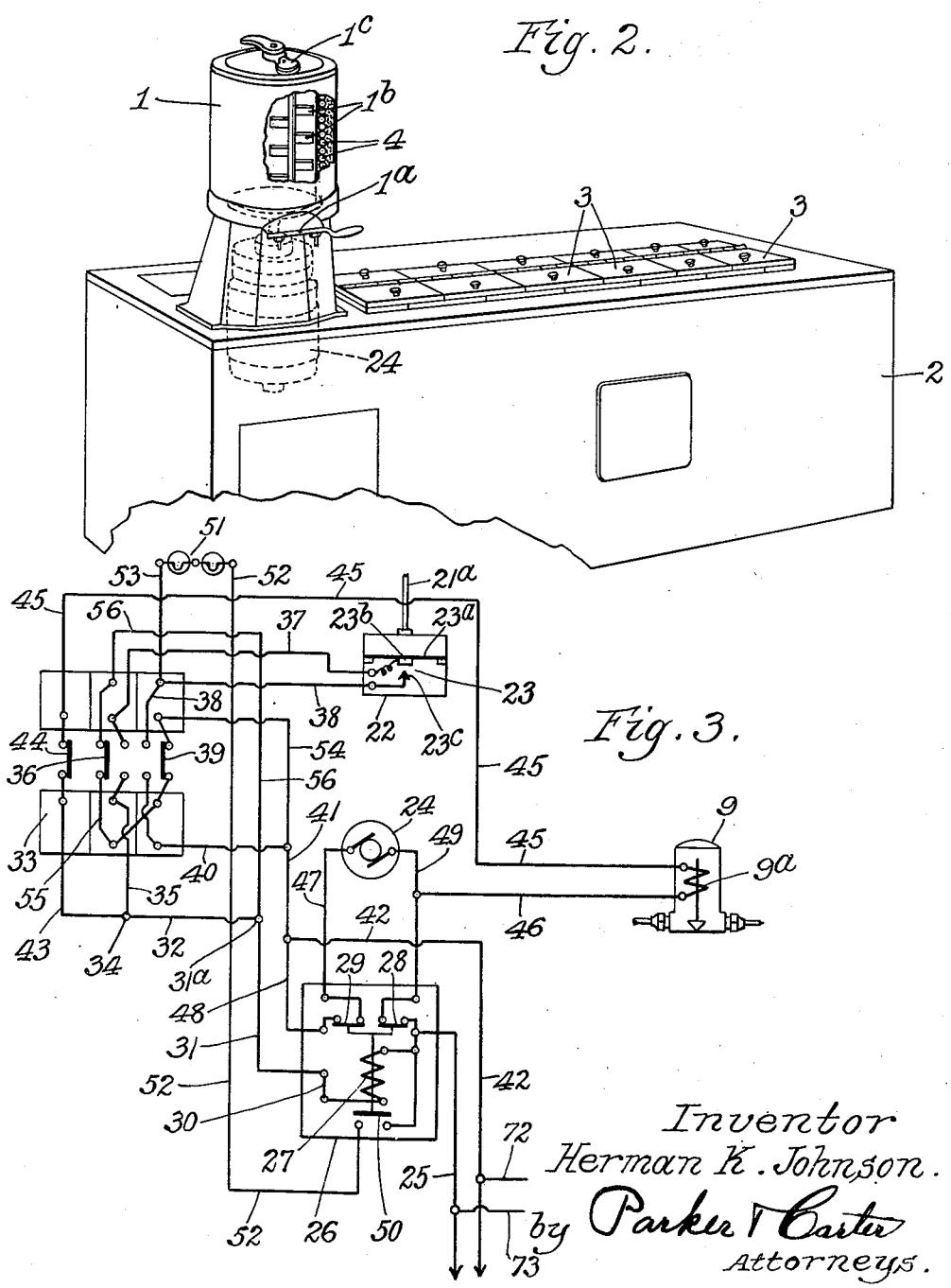

Patented Aug. 6, 1940

2,209,979

UNITED STATES PATENT OFFICE 2,209,979

APPARATUS FOR SERVING FROZEN CONFECTION PRODUCTS

Herman K. Johnson, Grand Haven, Mich., assignor to The Bastian-Blessing Company, Chicago, Ill., a corporation of Illinois Application October 22, 1937, Serial No. 170,463

13 Claims. (Cl. 62—114)

This invention relates to apparatus for serving frozen confection products and has for its object to provide a new and improved device of this description. The invention has as a further object to provide an apparatus for serving frozen confection products which may be used in connection with ice cream freezers of the type now in use and which can be arranged so that the freezer may be used in the usual manner and also may be used to provide soft ice cream or other soft cooled products which may be dispensed directly to the user from the freezer. The invention has as a further object to provide a device of this description for ice cream freezers which will act automatically to maintain the ice cream or other frozen product in the proper soft condition so that it may be dispensed directly from the freezer.

The invention has other objects which are more particularly pointed out in the accompanying description.

Referring now to the drawings,

Fig. 1 is a diagrammatic view of the system.

Fig. 2 is a view showing the freezer and hardening cabinet; and

Fig. 3 is a diagrammatic view showing the circuits when manual control is used.

Like numerals refer to like parts throughout the several figures.

Referring now to Fig. 2, I have shown an ice cream freezer 1 associated with a hardening cabinet 2 which has a cooling hardening coil and a series of places for the ice cream containers, access to said containers being provided by means of the covers 3. The ice cream or other material may be removed from the ice cream freezer through the draw-off gate 1a. The ice cream freezer is provided with a beater 1b which may be of any desired form and arrangement and which is preferably operated by an electric motor 24.

In Fig. 1 I have shown the entire system diagrammatically. In this construction there is shown the coil 4 for the ice cream freezer. There is a pipe 6 which leads to an expansion valve 7 and a pipe 8 leading from the expansion valve to a solenoid valve 9. There is a pipe 10 leading from the solenoid valve to the expansion valve 11, the expansion valve connecting with the hardening coil 12 for the hardening cabinet. The hardening coil expansion valve is controlled by a control device 13 located in proximity to the hardening coil and which may be any of the constructions used for this purpose. The pipe 10 is connected by a pipe 14 with the compressor 16 of the refrigerating apparatus and is used to conduct the refrigerant from the compressor to the various coils. The pipe 10 is provided with a shut-off valve 15 by means of which the refrigerant can be shut off from the hardening coil. The freezer coil 4 is connected by the pipe 5 with the compressor 16 of the refrigerating apparatus and through which refrigerant, after passing through the freezer coil, is returned to the compressor. A pipe 17 connects with the pipe 5 and leads to the hardening coil 12 so that the refrigerant after passing through the hardening coil, passes through the pipe 5 back to the compressor. There is a check valve 18 in the pipe 17 which prevents the refrigerant after passing through the freezer coil, from getting back into the hardening coil. There is also a shut-off valve 19 by means of which the hardening coil may be entirely shut off.

When it is desired to dispense the ice cream or other material directly from the freezer, some means is preferably provided for automatically keeping the temperature of the material in the freezer at such a temperature that it will be soft. I have provided automatic means for accomplishing this purpose. As herein shown, I provide means for starting and stopping the compressor motor and the freezer motor which drives the beaters. The starting and stopping of the freezer motor is accomplished by an electric temperature control apparatus. As herein shown, there is provided a bulb 20 in proximity to the freezer coil 4. This bulb is located in a copper tubing 21 which is filled with any suitable material, such as ice machine oil. This device communicates with the box 22 containing a switch 23 and is arranged so that when the temperature of the ice cream or the material in the ice cream freezer gets down to a predetermined temperature, say about 25 degrees Fahrenheit, the temperature control device acts to open the switch 23 and this stops the freezer motor and causes the solenoid valve 9 to close. One form of switch 23 is illustrated diagrammatically in Fig. 1, wherein there is a diaphragm 23a, which when moved, moves a contact 23b. Opposed to the contact 23b is a contact 23c. When the temperature of the bulb 20 rises, the pressure of the material in the tube 21a acts upon the diaphragm 23a and moves contact 23b into contact with contact 23c so as to close the switch 23. When the temperature lowers to a predetermined point, the pressure is decreased and the diaphragm 23a is moved so as to disconnect the contacts 23b and 23c. This temperature control device may be of any of the usual forms, such as, for example, the Penn Electric temperature control, although I do not limit myself to any particular temperature control switch.

When the temperature of the material in the freezer rises to a predetermined point, say to 27 or 28 degrees Fahrenheit, the temperature control device acts to close the switch 23. This closes the circuit through the solenoid 9a of the solenoid valve 9. This causes the solenoid valve to open so that the refrigerant passes from the compressor 16 through the pipes 14 and 10, and thence through solenoid valve 9, and thence through the pipe 8 and the expansion valve 7 and pipe 6 to the coil 4, and thence through the pipe 5 back to the compressor. The liquid refrigerant is turned into vapor as it passes through coil 4, cooling the material in the freezer. The freezer or beater motor 24 is started up and sets the beaters 1b, see Fig. 2, into operation in the freezer.

The compressor may be started up in any desired manner, as, for example, by closing the circuit through the compressor motor when the solenoid valve 9 is opened, or by any other suitable means, such as utilizing the back pressure created by converting the liquid refrigerant into vapor as it passes through coil 4, to actuate a switch which closes the motor circuit of the compressor. Any device of this kind now on the market may be used, such as that of the Penn Electric Company. In Fig. 1 I have illustrated means for controlling the compressor motor electrically when the solenoid 9a of the solenoid valve 9 is energized or de-energized.

When the device, for example, is set for automatic control, the circuits are as follows. From the source of supply to conductor 25 to motor starter 26, thence through magnetic coil 27, which is energized by closing the switch 23 and which when energized closes switches 28 and 29. From magnetic coil 27 the current passes to conductor 30, conductors 31 and 32 to the main switch 33. At the point 34 the current divides, part of it going to the coil 9a of the solenoid valve 9, which will be hereafter traced, and part of it passing through the switch 23. This part passes from conductor 32 to conductor 35, thence through switch 36 and conductor 37 to switch 23, thence by conductor 38 to switch 39, and thence by conductor 40 to conductor 41, and thence by conductor 42 back to the source of supply. The part of the current which divides at 34 passes through conductor 43, thence through switch 44, which is now closed, thence through conductor 45 to the solenoid coil 9a of solenoid valve 9, thence by conductor 46, thence through motor 24, thence by conductor 47 to switch 29, thence by conductor 48 to conductor 42 and back to the source of supply. This causes the solenoid valve 9 to open and deliver the refrigerant material to the coil 4 of the freezer.

The compressor 16 is automatically started up in any desired manner. I have shown this as being accomplished by the variations in pressure in the system. When the refrigerant liquid passes through the expansion valve and into the coil 4, it turns into vapor and raises the back pressure and this in turn closes the switch which connects the compressor motor in circuit and the compressor will then start. Any suitable means of controlling the compressor may be used. In Fig. 1 I have shown diagrammatically one arrangement for this purpose. In this construction there is a casing 57 provided with the two diaphragms 58 and 59. A pipe 60 connects the pipe 14 with the casing 57 on one side of the diaphragm 59. The pipe 5 which returns the gas to the compressor has a connection 61 which leads to the casing 57 on one side of the diaphragm 58. When the solenoid valve 9 is opened there is produced a differential in pressure in the pipes 5 and 60 and the pipe 61 and this causes the switch in the casing 57 to close by moving the diaphragms relatively to move the contacts 62 and 63 into contact to complete the circuit. The contact 62 is connected by a conductor 64 with the magnetic coil 65 of the starter 66 and when the circuit is closed, the magnetic coil 65 is energized and that closes switches 67 and 68. This connects conductors 69 and 70 leading to the compressor motor 71 in circuit with the conductors 72 and 73 which are connected to current supply conductors 25 and 42 and this sets the compressor motor in operation. When the solenoid valve 9 is closed, the variation in pressure moves the diaphragms 58 and 59 to open the circuit and shut down the compressor.

The circuit is completed through the freezer motor and the beaters 1b are set in operation, the circuit through the motor being as follows. From conductor 25 through switch 28, thence by conductor 49 through the motor 24, thence by conductor 47 to switch 29, conductor 48 and conductor 42 back to the source of current supply. The refrigerating machine is now in operation and the refrigerant is passed through the coil 4 of the freezer so as to cool the material therein.

When the material in the freezer is lowered to the proper temperature, the switch 23 is opened by the action of the bulb 20. This de-energizes the magnetic coil 27 and causes the switches 28 and 29 to open, thereby stopping the freezer motor 24 and closing the solenoid valve 9. When the magnetic coil 27 is de-energized, in addition to opening the switches 28 and 29, it closes the switch 50. This connects the pilot light 51 in circuit, the circuit being as follows: From conductor 25 through switch 50, thence through conductor 52 to pilot light 51, thence by conductor 53 to conductor 38, thence through switch 39 to conductor 40, thence to conductor 41 and conductor 42 back to the source of supply. The pilot light indicates that the material in the freezer is at the proper temperature to be served. When the temperature of the material rises to a predetermined point, say to 27 or 28 degrees Fahrenheit, or any other predetermined point, the temperature control device, through the action of the bulb 20, acts to again close the switch 23 and the circuits are completed so as to open the solenoid valve 9 and start the freezer motor 24 in operation and turn off the pilot light, as herein before described. It will be seen that by means of this construction the main switch can be set in a particular position and the device will then act automatically to maintain the material in the freezer at the proper temperature desired.

When it is desired to have an overrun or serve the material directly from the freezer, the freezer motor 24 is set in operation. To accomplish this, the main switch 33 is moved so as to disconnect conductors 38 and 40 and connect conductors 54 and 55. The switch 36 is moved so as to connect conductors 55 and 56. This energizes the magnetic coil 27, which closes the switches 28 and 29, the circuit through the magnetic coil being as follows. From conductor 25 through magnetic coil 27 to conductor 31, thence through conductor 56 and switch 36 to conductor 55, and thence through switch 39 to conductor 54, and thence to conductors 41 and 42 back to the source of supply. The circuit through the motor 24 is as follows. From conductor 25 through switch 28, thence by conductor 49 through motor 24, thence by conductor 47 to switch 29, thence by conductor 48 to conductor 42 and back to the source of supply. This causes the beater motor to operate so as to act upon the material in the freezer, so that the proper overrun can be secured and so that the material in the freezer can be discharged through the draw-off gate 1a when it is desired to dispense it from the freezer.

If it is desired not to use the automatic feature of the device, then the device may be operated by manual control. In that event, the main switch is moved so that the switch 44 will connect conductors 43 and 45, and the switch 36 connect conductors 55 and 56, and the switch 39 connect conductors 54 and 55. This cuts out the switch 23 and completes the circuit through the magnetic coil 27, the freezer motor 24 and the solenoid coil 9a of the solenoid valve 9. These circuits in order to be more easily traced, have been set out in a separate figure, Fig. 3. The circuit through the magnetic coil 27 is as follows. From conductor 25 to magnetic coil 27, thence by conductor 30 and conductor 31 to point 31a, where the current divides, one portion going to the solenoid valve and the other portion going by way of conductor 56 to switch 36, thence by conductor 55 to switch 39, thence by conductor 54 to conductor 41, thence by conductor 42 back to the source of supply. The other part of the current that divides at 31a passes through conductors 32, 43 and 45 to the solenoid coil 9a of solenoid valve 9, thence by conductor 46 to conductor 49, thence through motor 24 and conductor 47, switch 29, and conductor 48 to conductor 42 and then back to the source of supply. The current through the motor 24 passes from conductor 25 through switch 28, conductor 49, motor 24, conductor 47, switch 29, conductor 48 and conductor 42 back to the source of supply. The circuit through the compressor motor is also completed as before set out.

It will be seen that by this construction by merely moving the main switch 33, the device may be hand operated and the beater motor 24 operated and the solenoid valve 9 opened. When it is desired to overrun or to run the beater motor 24 to assist in delivering the material from the freezer, the main switch 33 is moved so as to move switch 44 to disconnect conductors 43 and 45 and this disconnects the solenoid coil 9a from the circuit so as to close the solenoid valve 9 and stop the refrigerant from passing through the coil 4, the motor in the meantime remaining in operation.

When the soft ice cream or malted milk is being withdrawn from the freezer, the freezer motor must be in operation because it is necessary that the beater be operating in order that the material may be withdrawn from the freezer. Under these circumbstances, as above set out, the circuits are changed so that only the freezer motor is in operation.

I have illustrated the various circuits and switch members diagrammatically in order that their operation may be easily understood. It is of course evident, however, that any suitable switch moving and controlling devices may be used. I prefer to arrange the switch 33 with a single handle connected up with the switch members. The first position is a manual control, at which the operator can make ice cream the same way as with the old standard freezer. In other words, when the switch is in this position, the solenoid valve is opened and the freezer motor started. The temperature control is not connected and the operator can make ice cream and get any amount of overrun he desires. It is understood that when the temperature and texture of the cream gets to the desired point the operator turns the control handle to cause the freezer motor only to be operated, the solenoid valve being then closed, and no more refrigerant goes to the freezer coil. All the machine is doing is whipping the material in the freezer.

The next position is the automatic control, which means that the operator has been making cream or other material and it is ready for serving, but the operator wants to keep the malted milk or soft ice cream in the freezer. At this position, the temperature control is connected, and as soon as the temperature in the freezer rises, the temperature control switch 23 closes, and this in turn opens the solenoid valve and both the compressor motor, as well as the freezer motor, will start. At this position the operator can leave his ice cream or malted milk in the freezer for quite a long time, and the pilot light will go one when the cream is ready for serving. In other words, the pilot light is on only when the cream is ready for dispensing. This means that the compressor is on off cycle.

The third position of the switch is for the freezer motor only, which means that when the operator has the control handle at this point, only the freezer motor is running, and not the compressor. The operator can use this position when he is dispensing soft ice cream or other material from the freezer, because it is necessary to have the freezer motor running when dispensing material from the freezer.

With the fourth position of the main switch the complete automatic control is out of the circuit, and the compressor unit is working on the hardening or dispensing cabinet that may be connected to the compressor unit.

In the device as shown there is no hand shut-off valve to the freezer, but instead of having a hand shutoff valve, I have the electric solenoid valve, which closes and opens when the main switch is in the right position.

This freezer is designed in such a manner that the operator can keep his ice cream or malted milk in the freezer. He can hold the temperature substantially uniform due to the temperature control used with the freezer. In other words, this invention provides a control which will automatically hold the temperature in the freezer substantially uniform, by means of a temperature control.

It will be noted that when this temperature control closes the switch 23, this, in turn, opens the solenoid valve, which means that the compressor unit and the freezer motor will start. As soon as the temperature gets down to about 25 degrees Fahrenheit, the temperature control opens the switch 23 and stops the freezer motor, as well as the compressor unit, and the pilot light goes on. It is understood that the operator has to turn the main switch to the position to operate the freezer motor only in order to get the proper overrun. The automatic control is there to hold uniform temperature in the freezer when the operator is using the frezer for dispensing purposes. In order to accomplish this particular setup, I have a main switch with four different positions. The reason for this is that ice cream mix varies considerably and in order to meet any conditions, it is necessary to have a flexible system. Such a flexible system as is herein shown takes care of any of the local conditions that may be present, such local conditions often requiring the manual control. In order to get the proper overrun for the freezer, the compressor motor is turned off and only the freezer motor operated. This requires the main switch 33 to have the position where the freezer motor only is running. When the main switch is in the off position, the automatic control is not being used and the compressor works only on the hardening cabinet. It is to be understood that the electric circuit for the compressor may be entirely separate from the other circuits heretofore set out and the compressor motor brought into action by means of the low pressure line from the freezer by means of any of the control devices now used for that purpose, as for example the Penn Electric control. It is of course evident that the device may be applied to direct or alternating current of any of the usual voltages by making the necessary changes which such different currents and voltages require.

When the material is served directly from the freezer, the hardening coil may be shut off if desired by closing the valves 15 and 19. The material from the freezer is served through the drawoff gate 1a.

It will further be seen that I am able by this device to provide an automatic means for maintaining the material in the ice cream freezer at a temperature where it will be soft so that it can be served directly to the user and at a substantially uniform temperature. When the temperature in the freezer gets down to the correct temperature, temperature control switch 23 will open and further cooling in the freezer will cease. When the temperature of the freezer rises above a predetermined point and before the material becomes too soft, the temperature control switch 23 closes and the apparatus is set in operation so as to reduce the temperature to the predetermined point, whereupon the operation above described is repeated.

In the use of the device, the material such as the cream or malted milk is inserted in the freezer from time to time as required through the opening covered by the cover 1c.

It will further be noted that in this construction there is an automatic switch controlled by the temperature of the freezer and a circuit leading to the source of current supply, and that there is located in this circuit, a manually controlled switch 33 by means of which the circuits can be changed to make the device work automatically or to render the automatic operation ineffective. It will further be seen that by means of this manually operated switch in the circuit, the circuits can be easily and quickly arranged so that only the freezer motor will be in operation, or so that the freezer motor, the compressor motor and the solenoid valve will be operated, and that the operation of these devices may be secured either with or without the automatic control, thus giving the device a wide range of usefulness.

I have shown and described one form of device embodying the invention, but it is of course evident that the various parts, switches and electric circuits may be greatly varied, depending upon the conditions presented, without departing from the spirit of the invention as embodied in the claims hereto appended, and I therefore do not limit myself to the particular construction of the parts and arrangement of the circuits shown.

I claim:

1. An apparatus for making frozen confection products comprising a freezer, a beater therein for agitating the material in the freezer, a refrigerating device connected with said freezer to reduce said material to a frozen condition, means for successively withdrawing serving portions of the material from the freezer to be served directly to a customer, and means responsive to the temperature of the freezer for controlling the refrigerant passing to the freezer, so as to maintain the material in the freezer in a soft condition while being served directly from the freezer to a user.

2. An apparaus for making frozen confection products comprising a freezer, a beater therein for agitating the material in the freezer, a refrigerating device, a coil for cooling said freezer connected with said refrigerating device to reduce said material to a frozen condition, means for successively withdrawing serving portions of the material from the freezer to be served directly to a customer, a control device intermediate said coil and said refrigerating device, and means responsive to the temperature of said coil for actuating said control device to control the refrigerant passing through said coil to maintain the material in the freezer at a substantially uniform temperature and in a soft condition while being served directly from the freezer to a user.

3. An apparatus for making frozen confection products comprising a freezer, a beater therein for agitating the material in the freezer, a refrigerating device, a coil for cooling said freezer connected with said refrigerating device to reduce said material to a frozen condition, means for successively withdrawing serving portions of the material from the freezer to be served directly to a customer, a valve intermediate the coil and the refrigerating device and means responsive to the temperature of said coil for actuating said valve to control the temperature of said coil so as to maintain the material in the freezer in a soft condition while being served directly from the freezer to a user.

4. An apparatus for making frozen confection products comprising a freezer, a beater therein for agitating the material in the freezer, a refrigerating device, a coil for cooling said freezer connected with said refrigerating device to reduce said material to a frozen condition, means for successively withdrawing serving portions of the material from the freezer to be served directly to a customer, a valve intermediate the coil and the refrigerating device, an electromagnetic device for operating said valve, a switch for said electromagnetic device and temperature control means associated with said freezer for controlling said switch, to cause the electromagnetic device to actuate said valve to maintain the desired temperature of the material in said freezer, while being served directly from the freezer to a user.

5. An apparatus for making frozen confection products comprising a freezer, a beater therein for agitating the material in the freezer, a refrigerating device, a coil for cooling said freezer connected with said refrigerating device to reduce said material to a frozen condition, means for successively withdrawing serving portions of the material from the freezer to be served directly to a customer, means responsive to the temperature produced by the coil for controlling the refrigerant passing through the coil, so as to maintain the material in the freezer in a soft condition while being served directly from the freezer to a user, and an indicating device for indicating when the material in the freezer is in proper condition to be served.

6. An apparatus for making frozen confection products comprising a freezer, a beater therein for agitating the material in the freezer, a refrigerating device, a coil for cooling said freezer connected with said refrigerating device, to reduce said material to a frozen condition, means for successively withdrawing serving portions of the material from the freezer to be served directly to a customer, means responsive to the temperature produced by the coil for controlling the refrigerant passing through the coil, so as to maintain the material in the freezer in a soft condition while being served directly from the freezer to a user, a lamp, and means associated with the freezer for maintaining the lamp in a lighted condition when the material in the freezer is in condition to be served directly to the user.

7. An apparatus for making frozen confection products comprising a freezer, a beater therein for agitating the material in the freezer, a refrigerating device, a coil for cooling said freezer connected with said refrigerating device to reduce said material to a frozen condition, means for successively withdrawing serving portions of the material from the freezer to be served directly to a customer, means responsive to the temperature produced by the coil for controlling the refrigerant passing through the coil, so as to maintain the material in the freezer in a soft condition while being served directly from the freezer to a user, and means for actuating said beater while the material is being served directly from the freezer.

8. An apparatus for making frozen confection products comprising a freezer, a beater therein for agitating the material in the freezer, a refrigerating device, a coil for cooling said freezer connected with said refrigerating device, to reduce said material to a frozen condition, means for successively withdrawing serving portions of the material from the freezer to be served directly to a customer, a valve intermediate the coil and the refrigerating device, an electromagnetic device for operating said valve, a switch for said electromagnetic device and temperature control means associated with said freezer for controlling said switch, to cause the electromagnetic device to actuate said valve to maintain the desired temperature of the material in said freezer while being served directly from the freezer, electrical connections between said switch and said electromagnetic device and a control switch for said electrical connections.

9. An apparatus for making frozen confection products comprising a freezer, a beater therein for agitating the material in the freezer, a refrigerating device, a coil for cooling said freezer connected with said refrigerating device to reduce said material to a frozen condition, means for successively withdrawing serving portions of the material from the freezer to be served directly to a customer, a valve intermediate the coil and the refrigerating device, an electromagnetic device for operating said valve, a switch for said electromagnetic device, temperature control means associated with said freezer for controlling said switch, to cause the electromagnetic device to actuate said valve to maintain the desired temperature of the material in said freezer while being served directly from the freezer, a motor for actuating said beater, electrical connections for said switch and said motor, and a control switch for said electrical connections.

10. An apparatus for making frozen confection products comprising a freezer, a beater therein for agitating the material in the freezer, a refrigerating device, a coil for cooling said freezer connected with said refrigerating device to reduce said material to a frozen condition, means for successively withdrawing serving portions of the material from the freezer to be served directly to a customer, a valve intermediate the coil and the refrigerating device, an electromagnetic device for operating said valve, a switch for said electromagnetic device, temperature control means associated with said freezer for controlling said switch, to cause the electromagnetic device to actuate said valve to maintain the desired temperature of the material in said freezer while being served directly from the freezer, a motor for actuating said beater, an electric signalling device for indicating when the material in the freezer is in proper condition to be served directly from the freezer, and electrical connections for said switch, motor and signalling device and a control switch for said electrical connections.

11. An apparatus for making frozen confection products comprising a freezer, a coil therein, a connection from said coil to a source of refrigerant supply to reduce said material to a frozen condition, means for successively withdrawing serving portions of the material from the freezer to be served directly to a customer, a valve in said connection for controlling the refrigerant supply to said coil, an electromagnetic actuating device for said valve, an automatic switch, a controlling device for said automatic switch responsive to variations in the temperature of said freezer, electrical connections between a source of electrical supply and said automatic switch and electromagnetic actuating device for said valve and a manually operated switch in said electrical connections.

12. An apparatus for making frozen confection products comprising a freezer, beaters in said freezer, a freezer motor for said beaters, a coil in said freezer, a connection from said coil to a source of refrigerant supply to reduce said material to a frozen condition, means for successively withdrawing serving portions of the material from the freezer to be served directly to a customer, a valve in said connection for controlling the refrigerant supply to said coil, an electromagnetic actuating device for said valve, an automatic switch, a controlling device for said automatic switch responsive to variations in the temperature of said freezer, electrical connections between a source of electrical supply and said freezer motor, automatic switch and electromagnetic actuating device for said valve, and a manually operated switch in said electrical connections for varying the electrical circuits to include or exclude said automatic switch in circuit.

13. An apparatus for making frozen confection products comprising a freezer, beaters in said freezer, a freezer motor for said beaters, a compressor, a motor for operating the compressor, a coil in said freezer, a connection from said coil to said compressor, to reduce said material to a frozen condition, means for successively withdrawing serving portions of the material from the freezer to be served directly to a customer, a valve in said connection for controlling the refrigerant supply to said coil, an electromagnetic actuating device for said valve, an automatic switch, a controlling device for said automatic switch responsive to variations in the temperature of said freezer, electrical connections between a source of electrical supply and said freezer motor, compressor motor, automatic switch and electromagnetic actuating device for said valve, and a manually operated switch in said electrical connections for varying the electrical circuits so as to connect said freezer motor, compressor motor and electromagnetic actuating device for said valve in circuit with or without said automatic switch.

HERMAN K. JOHNSON.